Patented Mar. 2, 1954

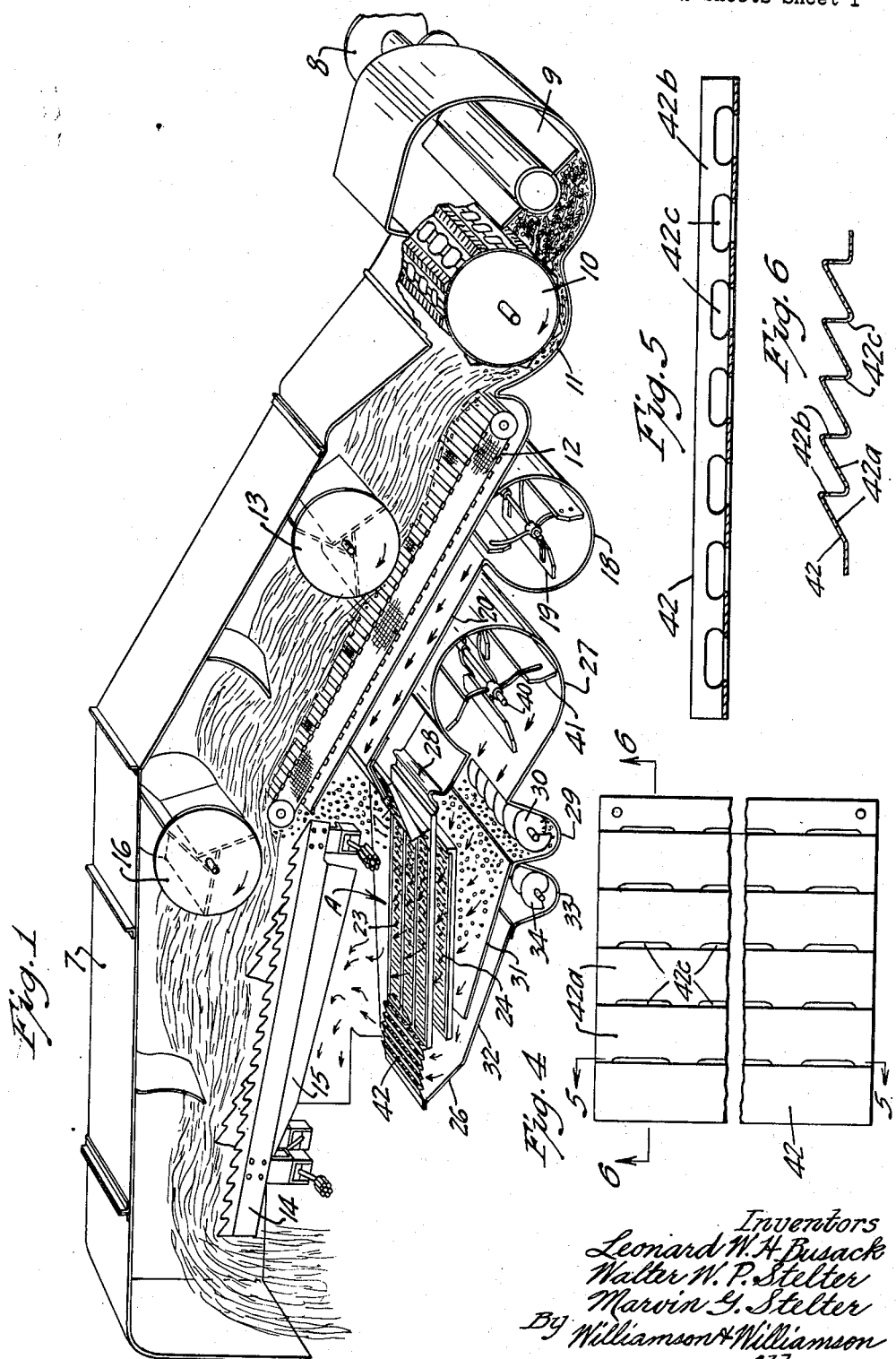

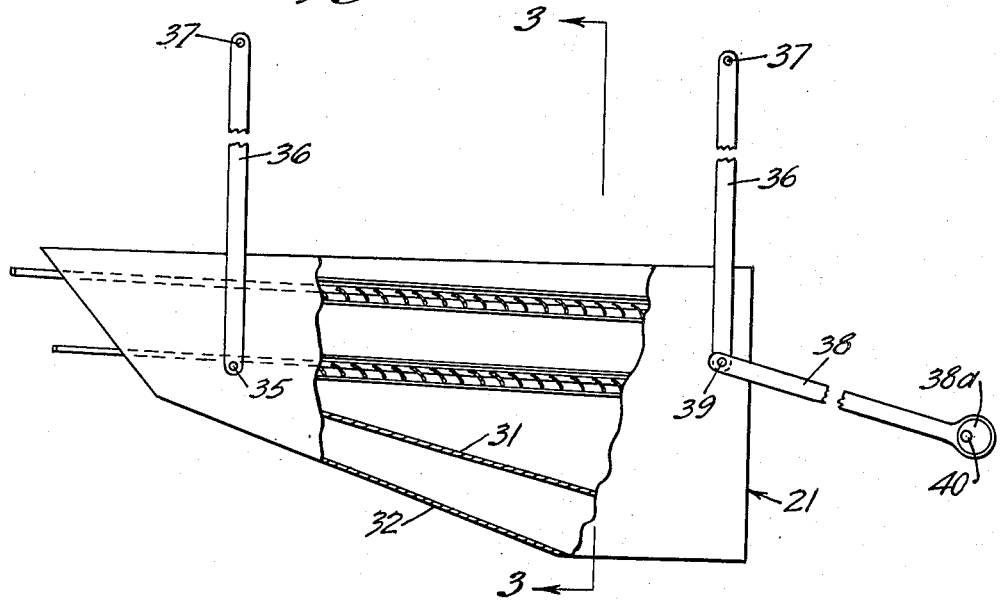
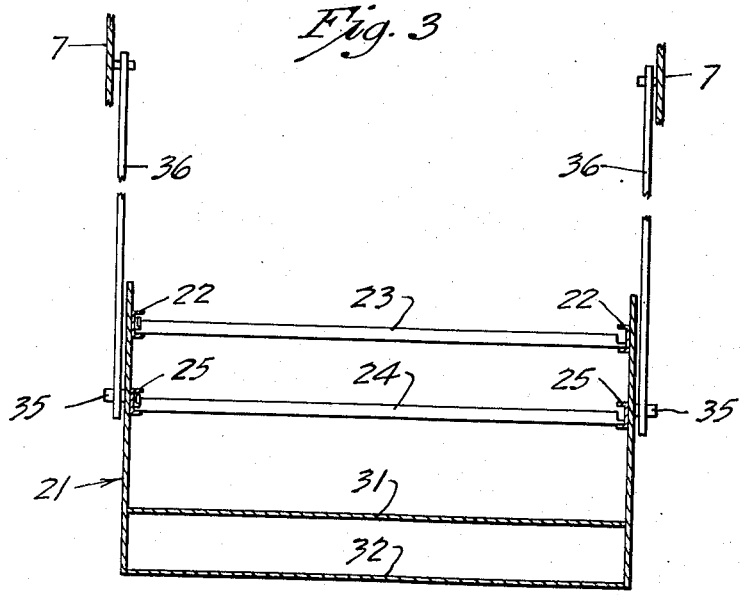

2,670,845

UNITED STATES PATENT OFFICE 2,670,845

GRAIN SEPARATING PROCESS AND APPARATUS

Leonard W. H. Busack, Marvin G. Stelter, and Walter W. P. Stelter, Echo, Minn.

Application June 30, 1950, Serial No. 171,474

14 Claims. (Cl. 209—26)

This invention relates to separating processes and apparatus for separating grain from chaff as in combines and threshing machines.

In the usual combine or threshing machine, the grain is first acted upon by the cylinder and concave and thereafter the straw is separated from the grain and chaff. The grain and chaff is then fed onto a cleaner shoe which is employed to separate the grain from the chaff. The usual cleaner shoe includes an adjustable chaffer sieve onto the rear end of which the grain and chaff are fed. Below this chaffer sieve is located an adjustable cleaner sieve and projecting forwardly from the forward end of the chaffer sieve a tailings sieve is generally provided. The three sieves are enclosed by a windbox which projects downwardly from the sides of the chaffer sieve and extends below the three sieves. A cleaner fan is connected to the rear portion of the windbox and below the cleaner sieve it is customary to provide a wind board which causes the air forced into the windbox by the cleaner fan to blow forwardly and somewhat upwardly through the windbox. Part of the air is blown upwardly and forwardly first through the cleaner sieve and thence through the chaffer sieve. Part of the air, however, is forced to the forward part of the box striking an end board which is located at the forward part of the windbox and this air is then customarily blown upwardly and forwardly through the tailings sieve or between the forward end of the chaffer sieve and the end board. The amount of air carried forwardly through the tailings sieve or between the forward end of the chaffer sieve and the end board is dependent largely on the adjustment of the chaffer sieve and the cleaner sieve. If the adjustable sieves are set so as to prevent too much trash from being dropped with the grain through these sieves, the air flow through the chaffer sieve and the cleaner sieve is decreased causing an increase in the amount of air blown out forwardly beyond the chaffer sieve. In such a construction, particularly when employed in connection with the separation of the finer grains such as flex, grass seed, brome grass, and also but to a lesser extent in connection with the separation of the coarser grains such as oats, barley and wheat, considerable grain is lost and dropped onto the ground by reason of the movement of the air forwardly through the tailings sieve, or where no tailings sieve is used between the forward end of the chaffer sieve and the forward end of the windbox. In other words, if the adjustable sieves are set so as to prevent too much chaff and trash being dropped through these sieves, as is often necessary, the air blast through the tailings sieve or between the forward end of the chaffer sieve and the end board is increased so as to carry over a great deal of the grain beyond the cleaner shoe to deposit it on the ground and thereby waste it.

We have discovered that if the air blast running through the tailings sieve or between the forward end of the chaffer sieve and the end board is controlled through the deflection of the air forwardly and upwardly to create a back eddy of air over the rear portion of the chaffer sieve, a great deal of the grain that would be otherwise lost is dropped onto the rear portions of the chaffer sieve and onto the tailings sieve to be thereafter recovered.

It is the general object of this invention, therefore, to provide an improved process for separating the chaff from grain during the movement of the same over the cleaner shoe during the threshing of the grain to prevent wastage of the grain.

More specifically, it is an object of this invention to provide a process of separating the chaff from the grain during the movement of the same over the cleaner shoe which consists in directing an air blast upwardly and forwardly through the grain and chaff while the grain is being sieved and directing an upwardly and rearwardly moving blast through the tailings from the sieving operation.

Another object is to provide an improved cleaner shoe for grain separators including means for directing an air blast upwardly and forwardly through the tailings from the chaffer sieve to carry the tailings in the eddy back over the rear portion of the chaffer sieve.

The objects and advantages of the invention will more fully appear from the following description made in connection with the accompanying drawings, wherein like reference characters refer to the same or similar parts throughout the several views, and in which Fig. 1 is a more or less diagrammatic view in perspective showing portions of a grain combine including therein a cleaner shoe wherein our invention is incorporated and wherein the processes of the invention are carried out;

Fig. 2 is a view in side elevation of the cleaner shoe illustrating a structure whereby the shoe may be vibrated, the wind box being partly broken away;

Fig. 3 is a vertical section taken through the cleaner shoe substantially on the line 3—3 of Fig. 2 as indicated by the arrows;

Fig. 4 is a plan view in enlarged scale illustrating the trailings sieve shown in Fig. 1;

Fig. 5 is a vertical section taken substantially on the line 5—5 of Fig. 4 as indicated by the arrows; and Fig. 6 is a vertical section taken substantially on the line 6—6 of Fig. 4 as indicated by the arrows.

Certain portions of a grain combine are illustrated more or less diagrammatically. The combine includes a casing 7. The cut grain is fed into the rear portion of this casing by a screw conveyor 8 carrying at its inner portion a stripper beater 9 which feeds the grain to a cylinder 10 working against a concave 11. From the cylinder and concave the grain is advanced to an endless slatted conveyor 12 which carries the material forwardly and upwardly from the cylinder and concave. While being carried by the conveyor 12 the grain is acted upon by a separator beater 13 and the material is delivered from the conveyor 12, the straw being carried forwardly and ejected from the machine by straw walkers 14 and the grain and chaff dropping downwardly from the troughs 15 of the straw walkers and from a separator beater 16 located forward of the forward end of the conveyor 12 onto an inclined riffled deck 17 discharging in turn onto the rear end of a cleaner shoe which is designated as an entirety by the letter A. Below the conveyor 12 is a separator fan housing 18 within which works a separator fan 19 which delivers air upwardly and forwardly along a wind board 20 to work against the grain and chaff running downwardly onto cleaner shoe A from the conveyor 12.

The cleaner shoe A includes an open topped wind box 21 within the upper portion of which is mounted as in channels 22 attached to the sides of the box an adjustable chaffer sieve 23, this chaffer sieve consisting of a series of pivoted louvers which are simultaneously adjustable to vary the space between the same. Spaced below the adjustable chaffer sieve 23 an adjustable cleaner sieve 24 is mounted in the windbox 20 as in channels 25 carried by the sides of the windbox and as in the case of the chaffer sieve the cleaner sieve 24 consists of a series of pivoted louvers which are simultaneously adjustable to vary the space between the same. The two adjustable sieves 23 and 24 extend forwardly from the downwardly inclined riffled deck 17 toward the forward portion of the windbox, but they terminate short of the forward portion of the windbox, the forward portion of the windbox being closed by an end board 26. A fan casing 27 is connected to the rear portion of the windbox A as by a flexible connection 28 and the lower portion of the fan casing 27 runs forwardly to join a grain trough 29 within which a spiral grain conveyor 30 is located which carries the grain off laterally to an elevator (not shown). The forward edge of the grain trough 29 underlies the rear end of an upwardly and forwardly inclined windboard 31 carried by the windbox 21, this windboard terminating short of the end board 26 of the windbox. The bottom 32 of the windbox inclines downwardly and rearwardly from the end board 26 in spaced relation below the windboard 31 to deliver into a tailings conveyor trough 33 within which works a screw-type tailings conveyor 34 which delivers laterally of the machine to an elevator (not illustrated), which will carry the material delivered by the tailings conveyor back to a point for rerun over the cleaner shoe A.

The windbox 21 carrying with it the adjustable chaffer sieve 23, the adjustable cleaner sieve 24, and the windboard 31, is suspended for vibratory movement by pins 35 carried at the sides of the windbox and journaled in hanger straps 36 pivotally connected as by pivots 37 as to the sides of the casing 7 of the machine. Vibratory movement is imparted to the windbox 21 of the cleaner shoe and, hence, to the adjustable chaffer sieve 23 and the adjustable cleaner sieve 24 by means of pitmans 38 pivotally connected to the rear portions of the windbox 21 by pivots 39, the said pitmans having at their rear ends strap-like eyes 38a working over eccentrics 40 carried by one of the rotary shafts of the machine such as the shaft of the cleaner fan 41 which works within the cleaner fan housing 27.

The parts thus far described are of standard construction and in the usual machine it is common practice to connect to the forward end of the chaffer sieve 23 a tailings sieve which runs across or partially across the space between the forward end of the chaffer sieve 23 and the upper portion of the end board 26. The normal tailings sieve is either perforated or it consists of tines permitting any wind carried forwardly through the windbox 21 by the cleaner fan to blow upwardly and forwardly through the tailings sieve or between the tailings sieve and end board 26.

In accordance with the form of the invention illustrated, there is provided a special tailings sieve 42 which is secured to the forward portion of the adjustable chaffer sieve 23 and projects forwardly therefrom to the upper portion of the end board 26. This tailings sieve 42 as best seen in Figs. 4, 5 and 6, consists of a stepped perforated plate, the forward portions of the steps forming upwardly and rearwardly inclined air deflecting surfaces 42a, and the rear portions of the steps 42b being substantially vertically arranged and having a multiplicity of perforations 42c therethrough, the said perforations running partially into the lower portions of the forward portions 42a of the steps.

When the machine is in operation, of course, the grain and chaff is delivered by the riffled deck 17 onto the rear portion of the adjustable chaffer sieve 23 of the cleaner shoe A. Of course, the entire windbox 21 carrying the three sieves 23, 24 and 42, is being constantly shaken through the action of the eccentrics 40 and the pitmans 38. The cleaner fan 41 delivers a blast of air forwardly and somewhat upwardly into the rear portion of the windbox 21 and this air is directed forwardly and somewhat upwardly by the windboard 31. This air divides, part of it running upwardly and forwardly first through the adjustable cleaner sieve 24 and thence upwardly and forwardly through the adjustable chaffer sieve 23. Of course, some air passes directly from the cleaner fan 41 between the adjustable cleaner sieve 24 and the adjustable chaffer sieve 23 to run upwardly and forwardly through the chaffer sieve without first passing through the cleaner sieve 24. A portion of the air blown through the windbox 21 runs forwardly to the forward end of the windbox, striking the end board 26 and being deflected upwardly therefrom. This air then strikes the upwardly and rearwardly inclined air deflecting surfaces 42a of the tailings sieve 42 and the air is then directed upwardly and rearwardly through the apertures 42c of this sieve so that the air emanating from the sieve 42 is directed upwardly and rearwardly to work in an eddy backwardly over the forward portion of the chaffer sieve 23. This backward moving eddy of air gradually merges into the forward moving body of air rising from the chaffer sieve 23 causing a lifting action of the main body of air rising from the chaffer sieve.

The adjustment of the two adjustable sieves, namely, the chaffer sieve 23 and the cleaner sieve 24, determines to a large extent the division of the air running upwardly and forwardly through the cleaner sieve and the chaffer sieve on the one hand, and the air running upwardly and rearwardly through the tailings sieve 42. For the best separation of the grain from the chaff, the chaffer sieve 23 and the cleaner sieve 24 are adjusted so that the major portion of the grain and chaff will be dropped onto the forward portions of the chaffer sieve 23. Some grain, however, will tend to be carried over past the forward end of the chaffer sieve and this grain will be met by the back draft of air or eddy current ejected from the tailings sieve 42 which will cause additional quantities of grain to be dropped either on the forward portion of the chaffer sieve or on the tailings sieve 42, thus preventing the carryover of the grain beyond the tailings sieve and the wastage of this grain by deposit upon the ground. In the case particularly of the separation of the finer grains such as flax, grass seed, and brome grass, it is necessary to adjust the two adjustable sieves 23 and 24 finer, i. e., close the louvers of these sieves somewhat in order to secure proper separation of the chaff from the grain. As this is done, the chaff load carries farther forwardly over the rear portions of the chaffer sieve 23 and the cleaner sieve 24, consequently causing a greater volume of air to move through the tailings sieve 42. If the air directed through the tailings sieve 42 were directed upwardly and forwardly instead of upwardly and rearwardly as by means of the present tailings sieve 42, as the adjustable sieve 23 and 24 were more tightly closed, a greater quantity of the grain would be carried onto the ground and wasted. However, with the present construction, as the draft increases through the tailings sieve, the back eddy from the tailings sieve 42 runs farther rearwardly over the chaffer sieve 23 permitting the dropping of the grain onto the sieve 23 or the sieve 42 without being carried onto the ground and wasted.

The particular tailings sieve 42 illustrated is, of course, only one type of sieve including air deflecting means that can be employed for causing the back eddy of air from the forward portion of the air box over the rear portion of the chaffer sieve. Other types of air deflecting means may be employed within the scope of the invention to accomplish the same end.

It will, of course, be understood that various changes may be made in the method and in the steps thereof and that various changes may be made in the form, details, arrangement and proportions of the various parts of the device without departing from the scope of the present invention, which, generally stated, consists in the matter shown, and described, and set forth in the appended claims.

What is claimed is:

1. The process of separating the chaff from grain during the movement of the same over the cleaner shoe during the threshing of the grain, which consists in directing an air blast upwardly and forwardly through the grain and chaff while the grain is being sieved and directing an upwardly and rearwardly moving air blast through the tailings from the sieving operation.

2. The process of separating the chaff from grain during the movement of the same over the cleaner shoe during the threshing of the grain, which consists in sieving the grain while directing an air blast upwardly and forwardly through the grain and chaff and directing a back draft of air upwardly and rearwardly through the tailings from the sieving operation.

3. A cleaner shoe for grain separators comprising a chaffer sieve, a windbox below and extending forwardly from said chaffer sieve, a cleaner fan communicating with the rear portion of said windbox and forcing the circulation of air forwardly through the windbox and upwardly and forwardly through said chaffer sieve, a tailings sieve running forwardly from the forward end of said chaffer sieve over said windbox, and means deflecting part of the air furnished to said windbox upwardly and rearwardly through said tailings sieve, thereby creating a back draft of air over the forward portion of said chaffer sieve above the same.

4. A cleaner shoe for grain separators comprising a chaffer sieve, a cleaner sieve spaced below said chaffer sieve, a windbox enclosing the sides of said chaffer sieve and cleaner sieve, projecting below the same and extending forwardly from said chaffer sieve and cleaner sieve, a cleaner fan communicating with the rear portion of said windbox and forcing the circulation of air forwardly through the windbox and upwardly and forwardly through the cleaner sieve and the chaffer sieve, a tailings sieve running forwardly from the forward end of said chaffer sieve over the windbox, and mechanism in the same general plane as said tailings sieve deflecting part of the air furnished to said windbox upwardly and rearwardly through said tailings sieve to eddy rearwardly over the forward portion of the chaffer sieve.

5. A cleaner shoe for grain separators comprising an adjustable chaffer sieve, an adjustable cleaner sieve spaced below said chaffer sieve, a windbox enclosing the sides of said chaffer sieve and cleaner sieve, projecting below the same and extending forwardly from said chaffer sieve and cleaner sieve, a cleaner fan communicating with the rear portion of said windbox and forcing the circulation of air forwardly through the windbox and upwardly and forwardly through the cleaner sieve and the chaffer sieve, a tailings sieve running forwardly from the forward end of said chaffer sieve over the windbox and having means inherent therein deflecting part of the air furnished to said windbox upwardly and rearwardly through said tailings sieve to eddy rearwardly over the forward portion of the chaffer sieve.

6. A cleaner shoe for grain separators comprising a chaffer sieve, a windbox below and extending forwardly from said chaffer sieve, a cleaner fan communicating with the rear portion of said windbox and forcing the circulation of air forwardly through the windbox and upwardly and forwardly through said chaffer sieve, a perforated tailings sieve running forwardly from the forward end of said chaffer sieve over said windbox, said tailings sieve having wind deflecting surfaces deflecting a portion of the air from the windbox rearwardly and upwardly through the perforations of the tailings sieve to carry over the rear portion of said chaffer sieve.

7. A cleaner shoe for grain separators comprising a chaffer sieve, a cleaner sieve below the chaffer sieve, a windbox encompassing the two sieves and projecting forwardly therefrom, a cleaner fan communicating with the rear portion of said windbox and forcing the circulation of air forwardly through the same and upwardly and forwardly through the cleaner sieve and the chaffer sieve, and a tailings sieve running forwardly from the forward end of said chaffer sieve over the windbox, said tailings sieve having upwardly and rearwardly inclined wind deflecting surfaces and being perforated rearwardly of said deflecting surfaces whereby a portion of the air running to the forward end of the windbox is deflected upwardly and rearwardly through the tailings sieve over the rear portion of the chaffer sieve.

8. A cleaner shoe for grain separators comprising an adjustable chaffer sieve, an adjustable cleaner sieve below the chaffer sieve, a windbox encompassing the two sieves and projecting forwardly therefrom, a cleaner fan communicating with the rear portion of said windbox and forcing the circulation of air forwardly through the fan and upwardly and forwardly through the cleaner sieve and the chaffer sieve, and a tailings sieve running forwardly from the forward end of said chaffer sieve over the windbox, said tailings sieve having upwardly and rearwardly inclined wind deflecting surfaces and being perforated rearwardly of said deflecting surfaces whereby a portion of the air running to the forward end of the windbox is deflected upwardly and rearwardly through the tailings sieve over the rear portion of the chaffer sieve.

9. A cleaner shoe for grain separators comprising a chaffer sieve, a windbox below and extending forwardly from said chaffer sieve, a cleaner fan communicating with the rear portion of said windbox and forcing the circulation of air forwardly through the windbox and upwardly and forwardly through said chaffer sieve, a stepped tailings sieve running forwardly from the forward end of said chaffer sieve over said windbox, the steps of said tailings sieve including forward upwardly and rearwardly inclined wind deflecting portions and perforated connecting portions connecting the upper and rear edges of the respective wind deflecting portions to adjacent steps, the said wind deflecting portions deflecting part of air from the windbox upwardly and rearwardly through said perforations over the forward portions of the chaffer sieve.

10. The structure defined in claim 9 and a cleaner sieve carried within said windbox below said chaffer sieve.

11. The structure defined in claim 9, said chaffer sieve being adjustable and a cleaner sieve carried within said windbox below said chaffer sieve.

12. The structure defined in claim 9, and means for agitating said chaffer sieve and said tailings sieve.

13. In grain separating machinery, a chaffer sieve, a cleaner sieve spaced below the same, a cleaner fan, a tailing sieve projecting forwardly from said chaffer sieve, means for vibrating all of said sieves, and means simultaneously directing a blast of air from said cleaner fan upwardly and forwardly through said cleaner sieve and chaffer sieve and upwardly and rearwardly from said tailings sieve.

14. A cleaner shoe for grain separators comprising an adjustable chaffer sieve to the rear end of which grain and chaff is adapted to be delivered, an adjustable cleaner sieve located in spaced relation below said chaffer sieve, a tailing sieve running forwardly from the forward end of said chaffer sieve, means mounting said three sieves for vibratory movement, a windbox enclosing said sieves at their sides and below the same, a cleaner fan forcing air through said windbox and through said three sieves, means for directing the air upwardly and outwardly through the cleaner sieve and the chaffer sieve and means for directing the wind passing upwardly through the tailings sieve rearwardly to create a back eddy of air over the forward portion of said chaffer sieve.

LEONARD W. H. BUSACK.
MARVIN G. STELTER.
WALTER W. P. STELTER.

References Cited in the file of this patent

UNITED STATES PATENTS

| Number | Name | Date |
|---|---|---|
| 27,834 | Schaeffer | Apr. 10, 1860 |
| 402,462 | Laufenburg | Apr. 30, 1889 |
| 500,136 | Kailor | June 27, 1893 |
| 990,804 | Clymans et al. | Apr. 25, 1911 |
| 1,112,848 | Seagren | Oct. 6, 1914 |
| 1,199,599 | Oletzky | Sept. 26, 1916 |
| 1,249,966 | Jones | Dec. 11, 1917 |
| 1,258,354 | Moore | Mar. 5, 1918 |
| 1,785,195 | Hoes et al. | Dec. 16, 1930 |
| 1,808,785 | Paradise et al. | June 9, 1931 |
| 2,228,228 | Ferguson | Jan. 7, 1941 |
| 2,250,383 | Koester | July 22, 1941 |
| 2,441,917 | Dion | May 18, 1948 |